United States Patent [19] [11] Patent Number: 4,587,390
Gray [45] Date of Patent: May 6, 1986

[54] VACUUM CIRCUIT BREAKER

[75] Inventor: Keith I. Gray, Napa, Calif.

[73] Assignee: Golden Gate Switchboard Co., Napa, Calif.

[21] Appl. No.: 689,328

[22] Filed: Jan. 7, 1985

[51] Int. Cl.[4] .................... H01H 33/66; H01H 33/42
[52] U.S. Cl. .......................... 200/153 SC; 200/148 F
[58] Field of Search .......... 200/153 SC, 144 B, 148 F

[56] References Cited

U.S. PATENT DOCUMENTS

| 3,183,332 | 5/1965 | Frink et al. | 200/153 |
|---|---|---|---|
| 3,203,505 | 8/1971 | Hannauer | 185/40 |
| 3,254,186 | 5/1966 | Fischer | 200/153 |
| 3,544,931 | 12/1970 | Patel | 335/174 |
| 3,581,028 | 5/1971 | Valbona | 200/38 |
| 3,585,330 | 6/1971 | Bould | 200/153 |
| 3,590,192 | 6/1971 | Bould et al. | 200/153 |
| 3,600,538 | 8/1971 | Puzas et al. | 200/153 |
| 3,600,540 | 8/1971 | Bould | 200/153 |
| 3,627,937 | 12/1971 | Swanke et al. | 200/38 |
| 3,689,721 | 9/1972 | McGuffie | 200/153 |
| 3,729,065 | 4/1973 | Baskerville et al. | 185/39 |
| 3,806,684 | 4/1974 | Hauser | 200/153 |
| 3,898,409 | 8/1975 | Liebig et al. | 200/153 |
| 4,095,676 | 6/1978 | Howe et al. | 185/40 |
| 4,306,129 | 12/1981 | Bialkowski et al. | 200/144 B |
| 4,343,030 | 8/1982 | Date et al. | 200/153 SC |
| 4,417,111 | 11/1983 | Kishi et al. | 200/148 F |
| 4,419,553 | 12/1983 | Ohshita et al. | 200/153 SC |
| 4,434,331 | 2/1984 | Sakuma | 200/144 B |

FOREIGN PATENT DOCUMENTS 2803787 8/1979 Fed. Rep. of Germany ...... 200/153 SC

OTHER PUBLICATIONS

An Analysis and Report on Stored Energy Mechanisms—Bulletin 2803-1A, I-T-E Circuit Breaker Company.
Type VMX Vacuum Switchgear, English Electric Corporation—Publication 1337-Ed.A.
POWER/VAC Vacuum Circuit Breaker with ML-17 Mechanism, General Electric.
VAC-CLAD Metal-Clad Switchgear—Descriptive Bulletin 32-254, Westinghouse Electric Corporation.
Instructions for Type VCP Vacuum Circuit Breakers, Westinghouse Electric Corporation, I.B. 32-254-1, 1982.

Primary Examiner—Stephen Marcus
Assistant Examiner—Renee S. Luebke
Attorney, Agent, or Firm—Jack M. Wiseman

[57] ABSTRACT

A vacuum circuit breaker comprises an interrupter for each phase of a three phase electrical system. Each interrupter includes a cylindrical housing for containing circuit breaker contacts. The axes of the housings are vertically disposed and are arranged to define an equilateral triangle. Projecting radially outward from each housing in fixed relation thereto is a rigid fixed contact bus bar connection link and a rigid movable contact bus bar connection link. Ends of the fixed contact bus bar connection links are disposed in a parallel relation in a horizontal plane. Ends of the movable contact bus bar connection links are disposed in a parallel relation in a horizontal plane. Associated pairs of fixed and movable contact bus bar connection links for each interrupter are disposed in vertical alignment. At least the outboard cylindrical housings for the interrupters are adjustably rotatable about their respective axes for setting the distance between parallel ends of successive horizontally aligned bus bar connection links to adjust for a predetermined primary voltage of the electrical system.

18 Claims, 10 Drawing Figures

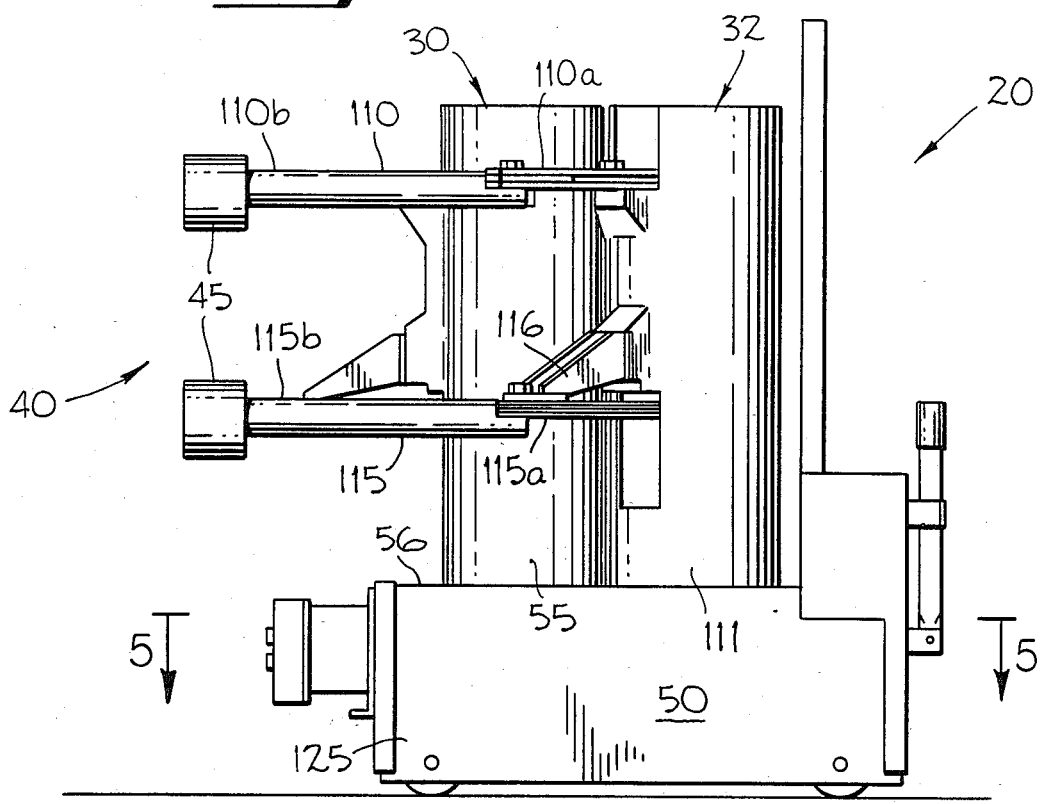
fig_1
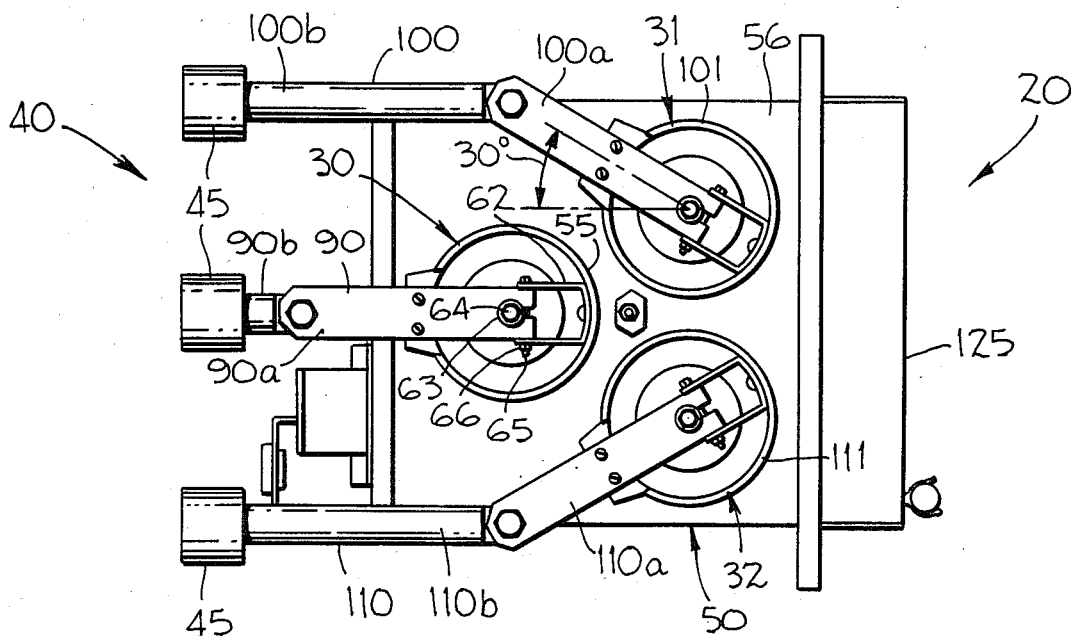
fig_2

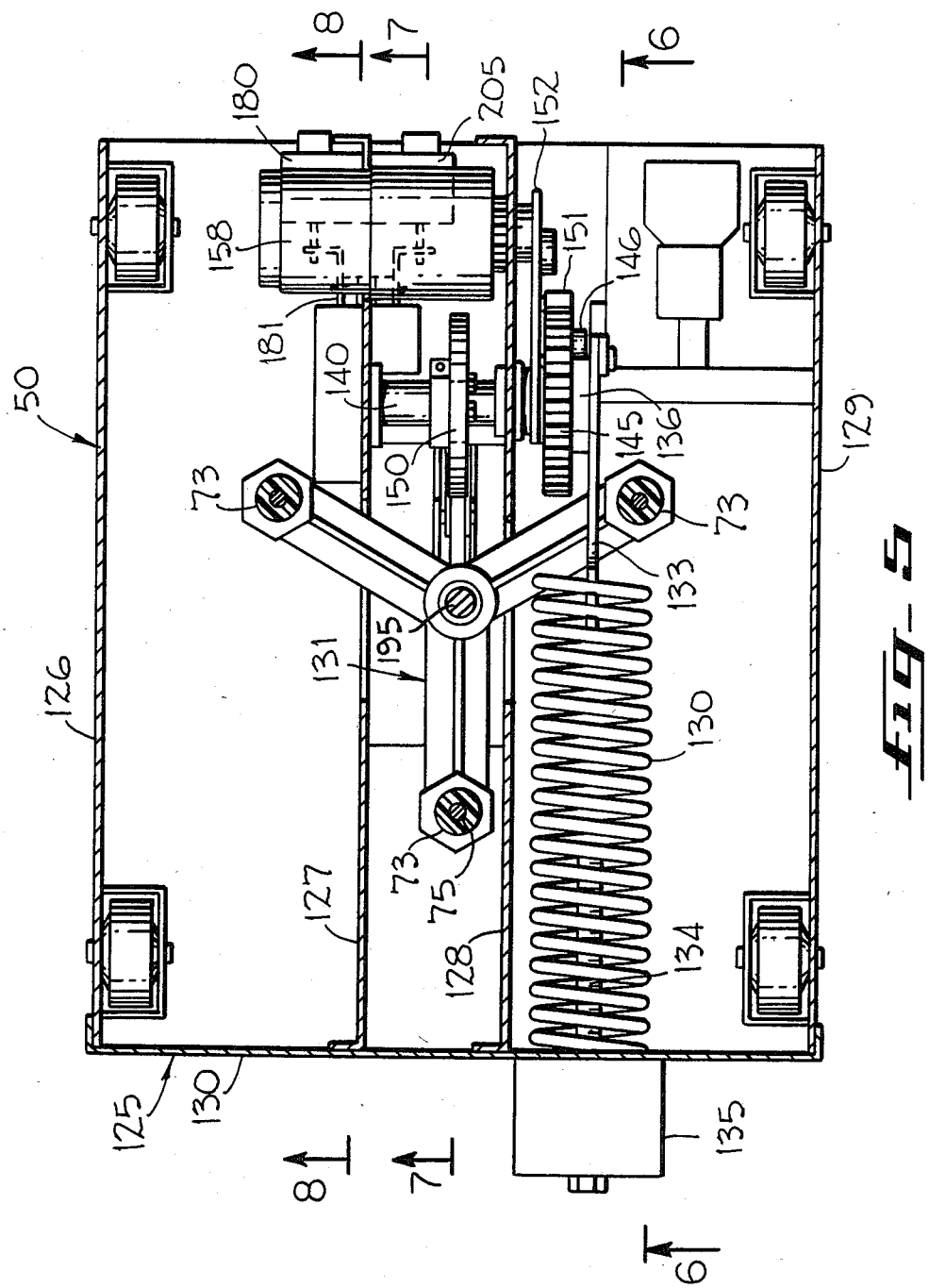

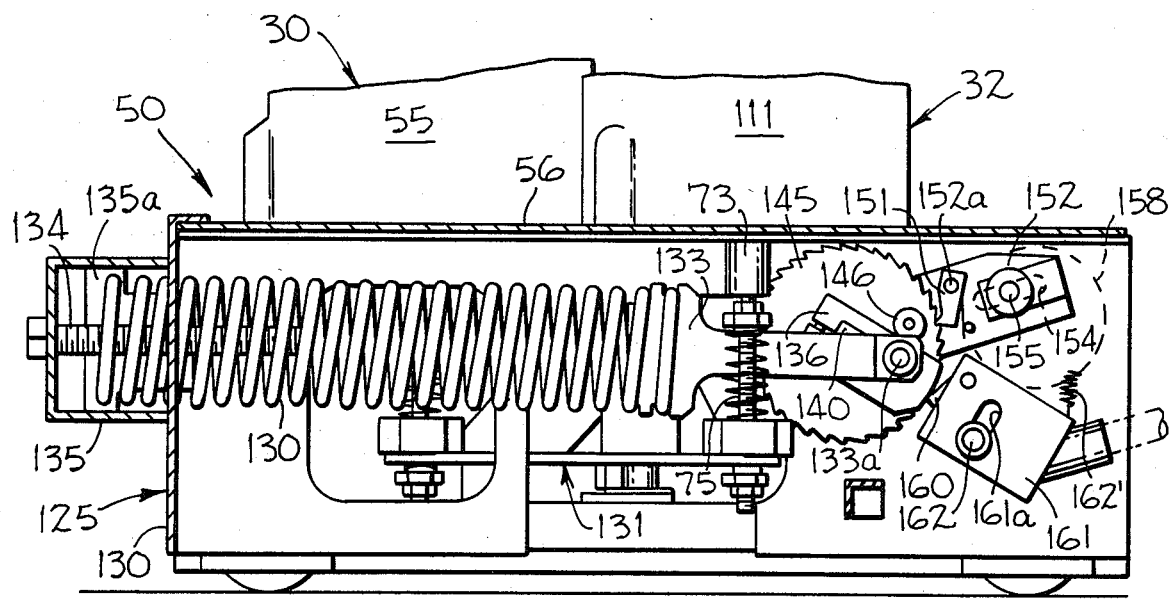
fig_6
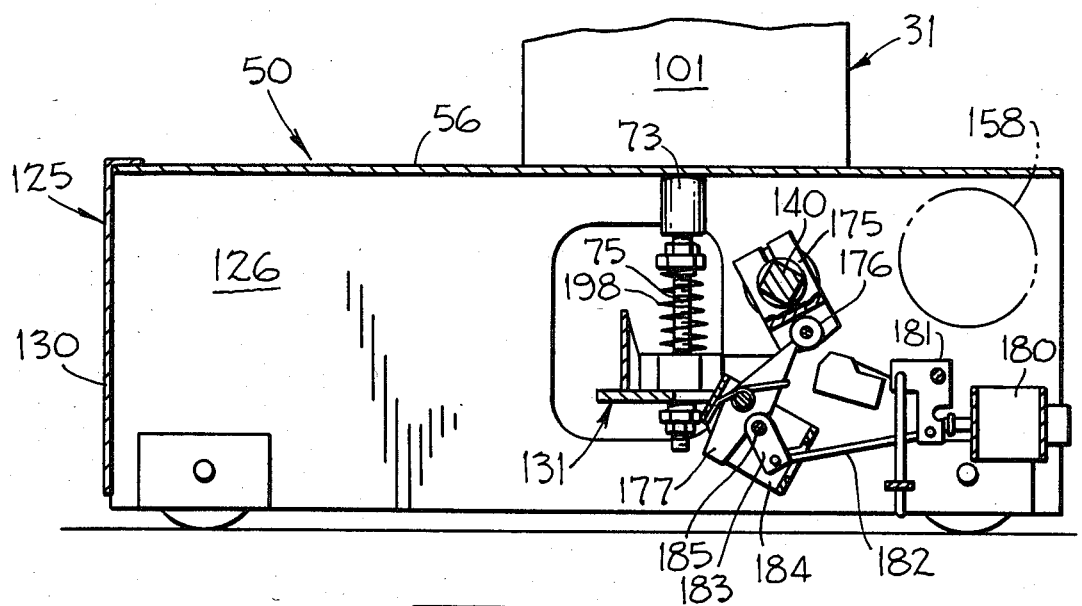
fig_8

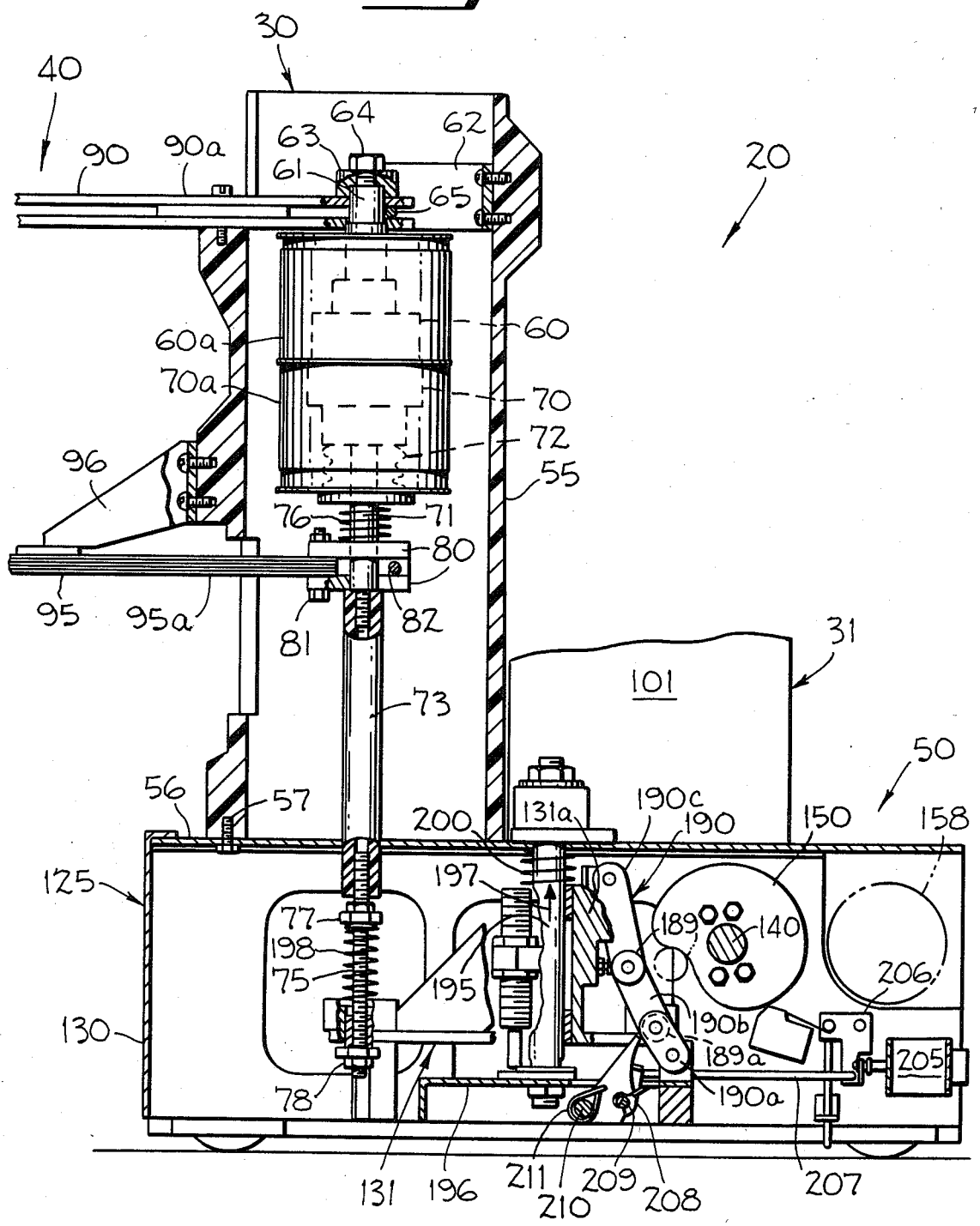

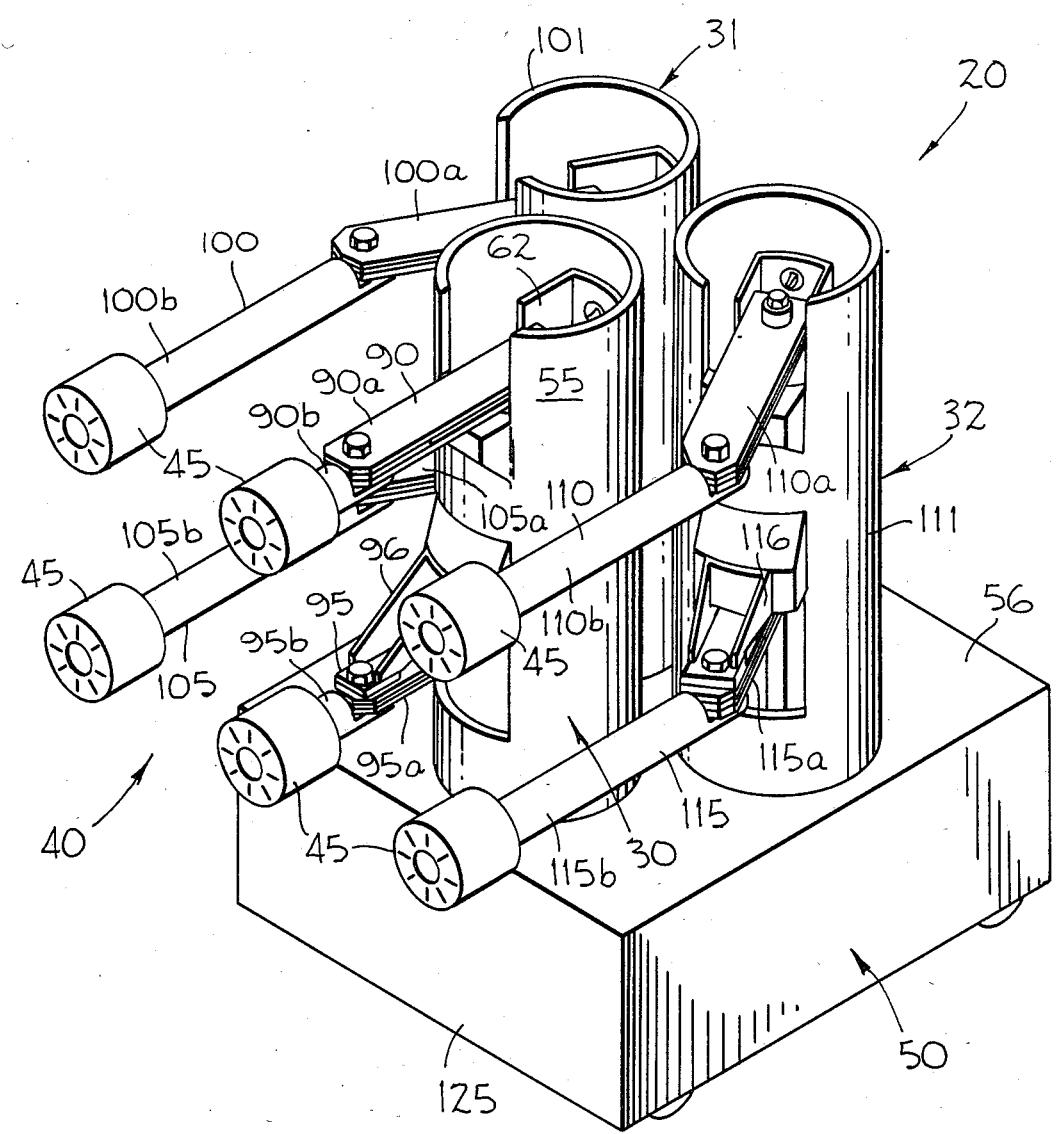
Fig_10

VACUUM CIRCUIT BREAKER

BACKGROUND OF THE INVENTION

The present invention relates in general to a circuit breaker, and more particularly to a circuit breaker for a three phase electrical system.

In the publication entitled An Analysis And Report On Stored Energy Mechanisms by Stanley E. Zocholl, I-T-E Circuit Breaker Publication, 2803-1A, there is disclosed a spring charging system for a circuit breaker.

The patent to McGuffie, U.S. Pat. No. 3,689,721, issued on Sept. 5, 1972, for Circuit Breaker Including Ratchet And Pawl Spring Charging Means And Ratchet Teeth Damage Preventing Means, discloses a circuit breaker in which a pawl advances a ratchet wheel. The pawl is mounted for free rotation on a drive shaft. For charging a closing spring, a driving connection between the ratchet wheel and the drive shaft is established to rotate the drive shaft as the ratchet wheel is rotated by the pawl.

The patent to Howe et al., U.S. Pat. No. 4,095,676, issued on June 20, 1978, for Stored Energy Operator For Breakers, discloses a circuit breaker comprising a spring actuated mechanism. A closing spring in the spring actuated mechanism is compressed. The release of the compressed closing spring causes the closing of circuit breaker contacts. A ratchet wheel is mounted on a cam shaft for free rotation. The ratchet wheel is coupled to the cam shaft during the compression of the closing spring and is decoupled from the cam shaft when the closing spring is released for the closing of the circuit breaker contacts.

English Electric Corporation of Port Chester, N.Y., has manufactured and sold Vacuum Switchgear, Type VMX. The VMX vacuum switchgear comprises a circuit breaker with three vacuum interrupters arranged to define a triangular configuration. There is an interrupter for each phase of the electrical system. The interrupters are actuated by an operating mechanism. A central lifting rod raises the closing mechanisms for the three interrupters simultaneously to provide concurrent closing of circuit breaker contacts.

General Electric Company has manufactured and sold a POWER/VAC Vacuum Circuit Breaker With ML-17 Mechanism in which primary connections are made by horizontal bars and disconnect fingers, which are electrically and mechanically connected to the vacuum interrupters. The operating mechanism provides vertical motion at each interrupter to move the lower contact of the interrupter from an open position to a closed position and back to the open position. The operating mechanism is of the stored-energy type and uses a motor to charge a closing spring. The closing spring is used to close the contacts of the circuit breaker.

Westinghouse Electric Corporation has manufactured and sold a VAC-CLAD METAL-CLAD SWITCHGEAR in which vacuum interrupters are vertically disposed and primary connections are mechanically and electrically established with the contacts within the interrupters through horizontally disposed bars.

SUMMARY OF THE INVENTION

A circuit breaker in which there is an interrupter for each phase of the electrical system. The axes of the housings of the interrupters are vertically disposed and are arranged to define an equilateral triangle. Electrical connections to the contacts contained within the interrupters are made by bus bar connecting links. Ends of the fixed contact bus bar connecting links are disposed in parallel relation in a horizontal plane. Ends of movable contact bus bar connecting links are disposed in parallel relation in a horizontal plane. At least two of the interrupter housings are adjustably rotatable about their respective axes for setting the distance between parallel ends of successive horizontally aligned bus bar connecting links to adjust for the magnitude of the primary voltage of the electrical system.

By virtue of the present invention, a circuit breaker is provided in which the interrupters occupy less space to achieve a more compact assembly and the distance between successive horizontally aligned bus bar connecting links is set by adjustably rotatable interrupter housing to accommodate the application of the electrical system requirements, such as the magnitude of the primary voltage. By adjustably setting the distance between successive horizontally aligned bus bar connecting links in accordance with the primary voltage, flashover propensity between successive horizontally aligned bus bar connecting links is reduced and excessive electromagnetic forces between successive horizontally aligned bus bar connecting links is minimized, while maintaining minimum space between bus bar connecting links.

DESCRIPTION OF THE DRAWINGS

FIG. 1 is a side elevation view of a vacuum circuit breaker embodying the present invention with a side wall removed.

FIG. 2 is a plan view of the vacuum circuit breaker shown in FIG. 1 with a top wall removed.

FIG. 5 is a horizontal section view partially in elevation of an operating mechanism employed in the vacuum circuit breaker shown in FIGS. 1-3 taken along lines 5—5 of FIG. 1.

FIG. 6 is a fragmentary vertical elevation view of the operating mechanism shown in FIG. 5 partially in section taken along lines 6—6 of FIG. 5.

FIG. 7 is a fragmentary vertical section view partially in elevation of an interrupter and the operating mechanism embodied in the vacuum circuit breaker shown in FIGS. 1-3 taken along lines 7—7 of FIG. 5 and illustrated with a portion of the bus bar connecting linkage.

FIG. 8 is a vertical elevation view partially in section of the operating mechanism shown in FIG. 5 taken along lines 8—8 of FIG. 5.

FIG. 10 is a diagrammatic perspective view of the vacuum circuit breaker shown in FIGS. 1-3.

DESCRIPTION OF THE PREFERRED EMBODIMENT

Figure 3:
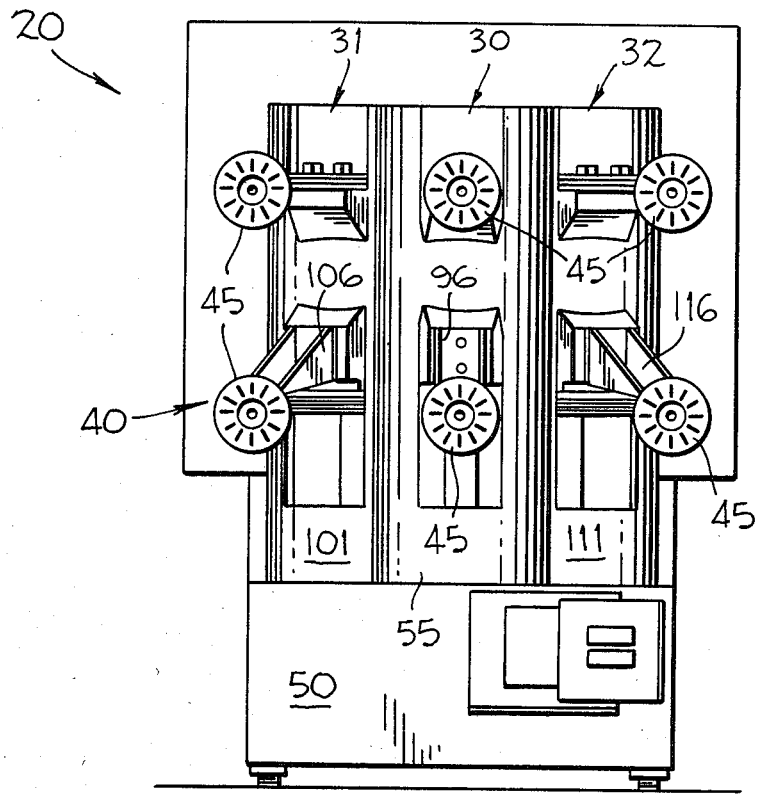
FIG. 3 is a rear elevation view of the vacuum circuit breaker shown in FIGS. 1 and 2.

Illustrated in FIGS. 1-3 and 10 is a circuit breaker 20 embodying the present invention. The circuit breaker 20 comprises interrupters 30-32 (FIGS. 2 and 10) for establishing and interrupting a primary circuit and for insulating the circuits from one another and ground. There is an interrupter for each phase of the electrical system in which the circuit breaker 20 is installed. In the exemplary embodiment, the electrical system in which the circuit breaker 20 is installed is a three phase system. Projecting from the interrupters 30-32 is a bus bar connecting linkage 40, which establishes electrical connections between the circuit breaker contacts contained within the interrupters 30-32 and bus bars of a primary circuit through primary electrical connection sockets and plugs 45 (FIG. 3). The interrupters 30-32 are actuated for the opening and closing of the breaker contacts therein through an operating mechanism 50 for the interruption or establishing of a primary circuit.

The interrupters 30-32 are identical in construction and in operation. Hence, only the interrupter 30 (FIG. 7) will be described in detail. The interrupter 30 comprises a cylindrical housing or tower 55 made of suitable rigid insulating material, such as a molded epoxy resin. The axes of the cylindrical housings of the interrupters 30-32 are vertically disposed and are arranged to define an equilateral triangle (FIGS. 1, 2 and 10). In this manner, the circuit breaker 20 is compact and occupies a minimum space.

The cylindrical housing 55 is releasably secured to a top panel 56 (FIG. 7) of the operating mechanism 50 by suitable means, such as nuts and bolts 57. The removal of the nuts and bolts 57 enables the cylindrical housing 55 to be adjustably rotated about its vertical axis. After adjustably rotating the cylindrical housing 55, the cylindrical housing 55 is releasably secured to the panel 56 by the action of the nuts and bolts 57 in a fixed adjusted angular position.

Disposed within the cylindrical housing 55 at the upper section thereof is a fixed interrupter or circuit breaker contact 60 (shown in dotted line in FIG. 7). A terminal post 61 is mechanically and electrically connected to the fixed contact 60 to support the same and to establish an electrical connection therewith. The terminal post 61 fits through a hole in both the upper and lower bus links 40, the outboard side of which has a slot extending from the back edge and running into the hole. A bracket 62 is secured to the cylindrical housing 55 by nuts and bolts. The bracket envelopes the bus links 40 up to the center of the terminal post 61. A bolt 65 runs between the outside edges of the bracket 62 and through the center of the two bus links 40, when the bolt and nut 66 are tightened. The bus links 40 are clamped onto the terminal post 61 and are held rigidly to the bracket 62. The bus links 40 are in turn secured to the cylindrical housing 55 by nuts and bolts. A spacer 63 is further clamped to the bus links by bolt 64.

Confronting the fixed contact 60 in vertical or axial alignment therewith is a movable interrupter or circuit breaker contact 70 (shown in dotted line in FIG. 7). Suitable ceramic envelopes 60a and 70a house the contacts 60 and 70, respectively, to provide a vacuum in a manner well-known in the art. A terminal post 71 is mechanically and electrically connected to the movable contact 70. The terminal post 71 has a threaded stud located at its lowest end to which is fitted an operating rod 73 made of a suitable insulating material. Screwed into the operating rod 73 at its lowest end is a metal stud 75 which runs through an operating arm 131 of the operating mechanism 50. Secured to stud 75 is a nut and locknut 77 which holds a contact pressure spring 198 against an operating arm 131. Also secured to stud 75 is a nut and locknut 78. When the circuit breaker is in the closed position, as shown in FIG. 7, the operating arm 131 is in its highest position with contacts 60 and 70 in contact. The contacts 60 and 70 are held in the contact condition by the compression of spring 198. There is also a gap between nut 78 and the operating arm 131. In the open position, the operating arm 131 has moved downward, nut 78 is in contact with the operating arm 131 and contacts 60 and 70 are separated. Attached to the contact 70 are bellows 72 which are also attached to the end plate of ceramic envelope 70a, thereby maintaining a vacuum within the envelope. A spring 76 is located between the ceramic envelope end plate and a contact block 80, which acts to negate the force the bellows 72 exert.

For establishing an electrical connection with the movable contact 70, two contact blocks 80 are employed. The terminal post 71 fits through a hole in each contact block 80, on one side of which is a slot extending from the back face into the hole. Passing between the two blocks 80 is a nut and bolt 82. When the nut and bolt 82 are tightened, the blocks 80 are securely clamped to the terminal post 71. Also mounted between the contact blocks 80 is a flexible connector 95, which is made of a number of thin copper strips. When the nut and bolt 81 are tightened, the flexible connector 95 is clamped between contact blocks 80. A mounting bracket 96 is secured to the cylindrical housing 55 and the outboard end of the flexible connector 95 is secured to the bracket 96. When the movable contact 70 is operated in the up and down directions, the outer end of flexible connector 95 remains stationary, while the end connected to the contact blocks 80 moves with the movable contact 70. This action is permitted by the relatively easy flexure of the copper strips in the flexible connector 95.

The vacuum interrupter 30 may be of the type manufactured by Westinghouse Electric Corporation as Model WL-34103. The vacuum interrupter 30 may also be of the type manufactured by Mitsubishi Electric Company as Model 10B12H.

Projecting radially outward from the interrupter housing 55 and electrically connected to the fixed contact 60 through the terminal post 61 is a fixed bus bar connecting link 90 of the bus bar connecting linkage 40 (FIGS. 2, 7 and 10). The fixed bus bar connecting link 90 includes a proximal section 90a and a distal section 90b. The sections 90a and 90b are secured to one another by nuts and bolts for initial angular adjustment relative to one another. The proximal section 90a of the link 90 is secured to the cylindrical housing 55 by nuts and bolts.

Projecting radially outward from the interrupter housing 55 and electrically connected to the movable contact 70 through the terminal post 71 and the band 80 is a movable bus bar connecting link 95 of the bus bar connecting linkage 40 (FIGS. 7 and 10). The movable bus bar connecting link 95 includes a proximal section 95a and a distal section 95b. The sections 95a and 95b are secured to one another by nuts and bolts for initial angular adjustment relative to one another. A bracket 96 is attached to the interrupter housing 55 and is fixed to the proximal end 95a of the movable bus bar connecting link 95. The bus bar connecting links 90 and 95 are vertically aligned.

From the foregoing, it is to be observed that the rotation of the interrupter housing 55 about its axis will impart therewith rotatable movement to the bus bar connecting links 90 and 95. Thus, angular movement of the housing 55 will result in a comparable rotatable movement to the bus bar connecting links 90 and 95.

In a similar manner, a fixed bus bar connecting link 100 (FIGS. 2 and 10) of the linkage 40 projects radially from a cylindrical housing 101 of the interrupter 31 and is electrically connected to a terminal post of a fixed contact thereof. The terminal post and the fixed contact for the interrupters 31 are similar to the terminal post and fixed contact described for the interrupter 30. The fixed bus bar connection link 100 is secured to the cylindrical housing 101 by nuts and bolts for rotation with the rotatable movement of the cylindrical housing 101. Likewise, a movable bus bar connecting link 105 of the linkage 40 projects radially from the cylindrical housing 101 of the interrupter 31 and is electrically connected to the terminal post of the movable contact thereof. The terminal post and the movable contact for the interrupters 31 are similar to the terminal post and movable contact described for the interrupter 30. The movable bus bar connecting link 105 is secured to the cylindrical housing 101 through a bracket 106. Thus, rotation of the cylindrical housing 101 imparts rotation to the movable bus bar connecting link 105.

The bus bar connecting links 100 and 105 are disposed in vertical alignment. The fixed bus bar connecting link 100 includes a proximal end 100a and a distal end 100b. The proximal end 100a and the distal end 100b are secured to one another at an adjusted angle through nuts and bolts. Similarly, the movable bus bar connecting link 105 includes a proximal end 105a and a distal end 105b. The proximal end 105a and the distal end 105b are secured to one another at an adjusted angle through nuts and bolts.

The distal end 100b of the fixed bus bar connecting link 100 is disposed in parallel relation with the fixed bus bar connecting link 90 and in a common horizontal plane. The distal end 105b of the movable bus bar connecting link 105 is disposed in parallel relation with the distal end 95b of the movable bus bar connecting link 95 and in horizontal alignment therewith.

In a like manner, a fixed bar connecting link 110 (FIGS. 1, 2 and 10) of the linkage 40 projects radially from a cylindrical housing 111 of the interrupter 32 and is electrically connected to a terminal post of a fixed contact thereof. The terminal post and fixed contact for the interrupter 32 are similar to the terminal post and fixed contact described for the interrupter 30.

The fixed bus bar connecting link 110 is secured to the cylindrical housing 111 by nuts and bolts for rotation with the rotatable movement of the cylindrical housing 111. Similarly, a movable bus bar connecting link 115 of the linkage 40 projects radially from the cylindrical housing 111 of the interrupter 32 and is electrically connected to the terminal post of the movable contact thereof. The terminal post and movable contact for the interrupter 32 are similar to the terminal post and movable contact described for the interrupter 30. The movable bus bar connecting link 115 is secured to the cylindrical housing 111 through a bracket 116. Thus, rotation of the cylindrical housing 111 imparts rotation to the movable bus bar connecting link 115.

The bus bar connecting links 110 and 115 are disposed in vertical alignment. The fixed bus bar connecting link 110 includes a proximal end 110a and a distal end 110b. The proximal end 110a and the distal end 110b are secured to one another at an adjusted angle through nuts and bolts. Similarly, the movable bus bar connecting link 115 includes a proximal end 115a and a distal end 115b. The proximal end 115a and the distal end 115b are secured to one another at an adjusted angle through nuts and bolts.

The distal end 110b of the fixed bus bar connecting link 110 is disposed in parallel relation with the distal end 90b of the fixed bus bar connecting link 90 and in horizontal alignment therewith. The distal end 115b of the movable bus bar connecting link 115 is disposed in parallel relation with the distal end 95b of the movable bus bar connecting link 95 and in the same horizontal plane.

To minimize flashover propensity between successive, horizontally aligned bus bar connecting links and to minimize electromagnetic interaction between successive, horizontally aligned bus bar connecting links while maintaining compactness and minimum use of space for the bus bar connecting linkage 40, it is desired to adjust the space between parallel sections of successive, horizontally aligned bus bar connecting links for optimum distance. Toward this end, the nuts and bolts attaching the cylindrical housings 101 and 111 of the interrupters 31 and 32, respectively, to the top panel 56 of the operating mechanism 50 are removed to enable the rotation of cylindrical housings 101 and 111 about their respective axes. The rotation of the cylindrical housing 101 imparts rotation to the links 100 and 105. The rotation of the cylindrical housing 111 imparts rotation to the links 110 and 115.

In a 15KV vacuum circuit breaker for a three phase electrical system with 8.67KV between successive, horizontally aligned bus bar connecting links and a current flow of up to 36KA, a 30 degree angle was employed for the outboard interrupters 31 and 32, respectively, between the center line of the associated proximal sections and a plane passing through the axis of the associated cylindrical housing and parallel to the center line of the associated distal sections (FIG. 2). In the exemplary embodiment, the distance between successive, horizontally aligned distal ends of the bus bar connecting links was ten inches. The distal ends of the bus bar connecting links for the outboard interrupters 31 and 32 were adjusted to be set parallel to the bus bar connecting links 90 and 95 for the interrupter 30.

Figure 4:
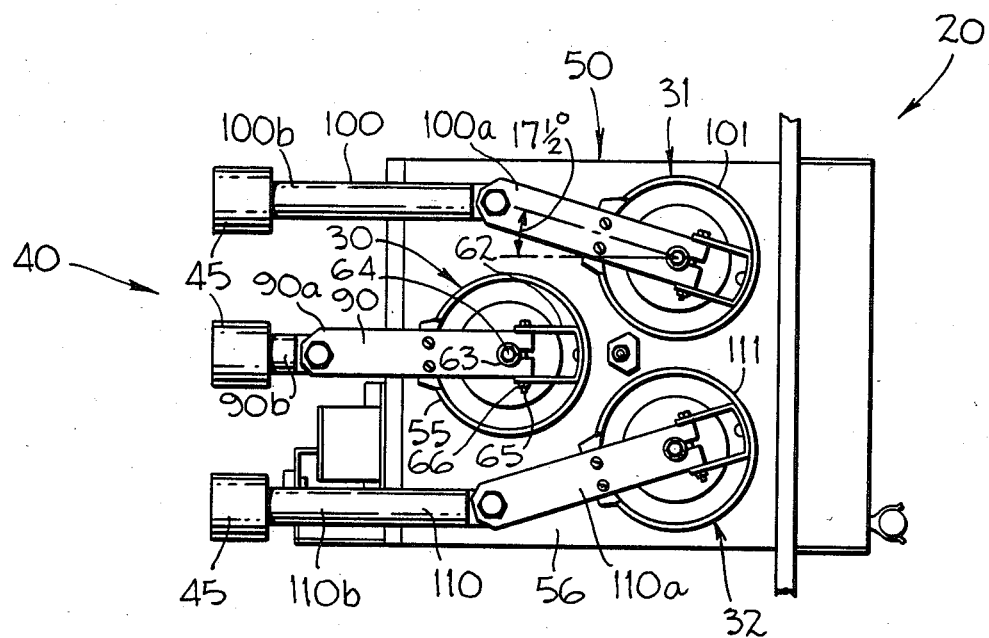
FIG. 4 is a plan view of the vacuum circuit breaker shown in FIGS. 1-3, with the outboard interrupter housings angularly displaced.

In a 5KV vacuum circuit breaker for a three phase electrical system with 2.75KV between successive, horizontally aligned bus bar connecting links and a current flow of up to 36KA, a 17 ½ degree angle was employed for the outboard interrupters 31 and 32, respectively, between the center line of the associated proximal sections and a plane passing through the axis of the associated cylindrical housing and parallel to the center line of the associated distal section (FIG. 4). In the exemplary embodiment, the distance between successive, horizontally aligned distal ends of the bus bar connecting links was eight inches. The distal ends of the bus bar connecting links for the outboard interrupters 31 and 32 were adjusted to be set parallel to the bus bar connecting links 90 and 95 for the interrupter 30.

By virtue of the foregoing arrangement greater flexibility and versatility in the manufacture of vacuum circuit breakers are achieved without sacrificing compactness. Various rated vacuum circuit breakers can be assembled without duplicity of similar operating components for greater manufacturing economy.

The distal ends of the bus bar connecting links of the linkage 40 are connected respectively to primary electrical connection sockets and plugs 45 for establishing electrical connections with the bus bars of the primary circuit in a well-known and conventional manner.

Illustrated in FIGS. 5-9 is the operating mechanism 50, which comprises a suitable housing 125, such as a steel housing. The housing 125 comprises the top panel 56 (FIGS. 6-8) and suitably spaced and bent integral side panels 126 and 129 with a bolted end plate 130.

Disposed within the housing 125 is a stored-energy closing spring 130 (FIGS. 5 and 6) that is initially charged and subsequently discharged for closing simultaneously a three arm yoke 131 (FIGS. 5-8) for closing the interrupter or circuit breaker contacts of the interrupters 30-32 simultaneously by lifting simultaneously the interrupter actuating rods or lifting rods 73. The interrupter contacts 60 and 70 for the interrupter 30 are shown in FIG. 7 and the lifting rod 73 for the interrupter 30 is also shown in FIG. 7. The interrupter contacts and the lifting rods 73 for the interrupters 31 and 32 are similar to the lifting rod 73 shown for the interrupter 30 and are illustrated in FIGS. 6 and 8.

For charging the closing spring 130, a closing spring lever 133 (FIGS. 5, 6 and 9) is axially disposed relative to the closing spring 130. One end of the closing spring 130 is secured into an anchor plate 135a, in the center of which is located a nut. Bolt 134 passes through the end plate of a tubular extension 135 in the housing 125 and is screwed into the nut of bracket 135a. By tightening the bolt 134, the end of the closing spring 130 is drawn into a tubular extension 135 and held rigidly where set. The extent to which the bolt 134 is tightened provides for adjustment of the force exerted by the closing spring 130 which in turn adjusts the breaker closing velocity. The other end of the closing spring 130 is attached to the closing spring lever 133 so that movement of the closing spring lever 133 in one direction extends the closing spring 130 to charge the same.

Figure 9:
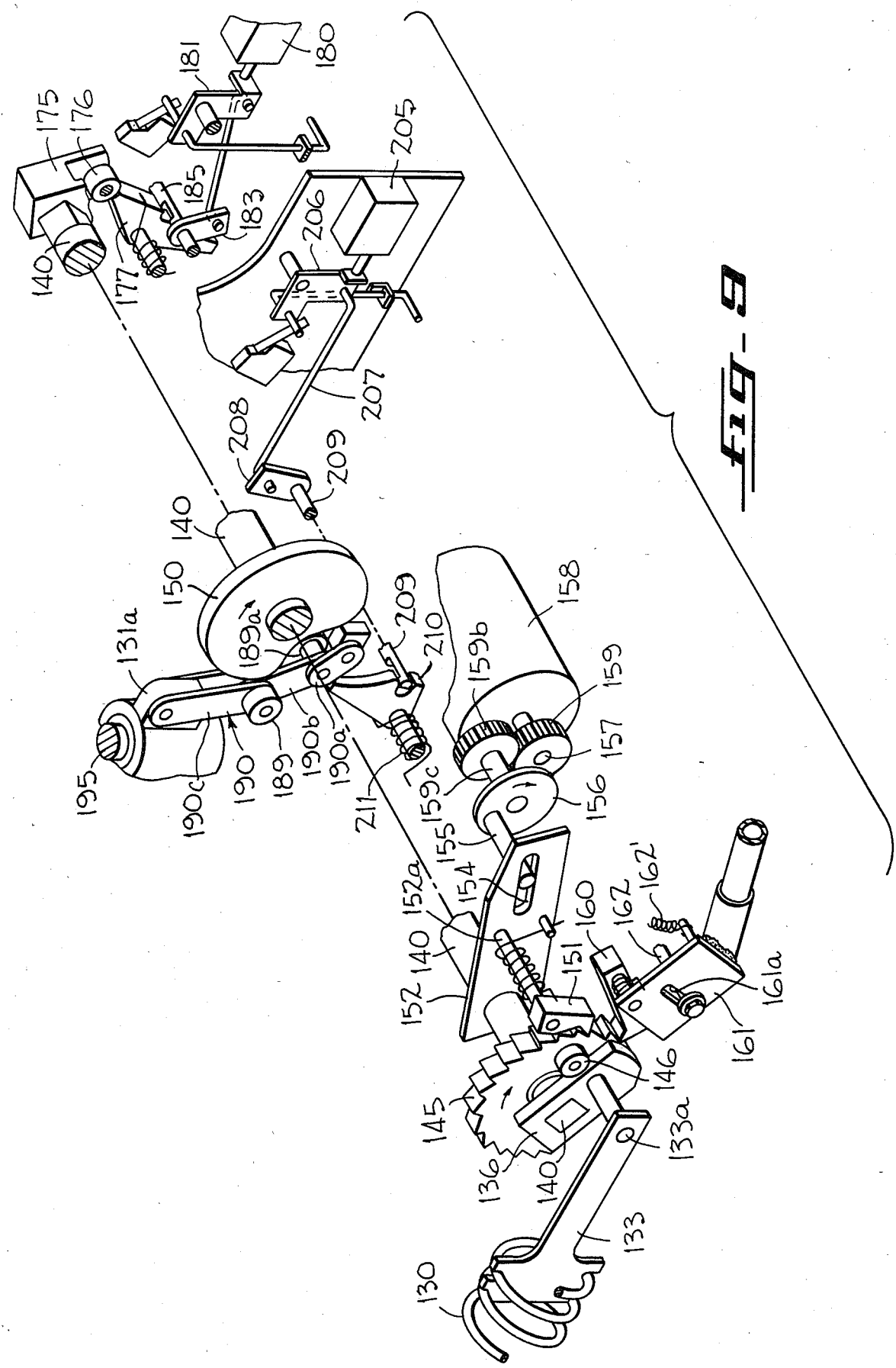
FIG. 9 is a diagrammatic fragmentary perspective view of the operating mechanism shown in FIGS. 5-8.

The closing spring lever 133 is eccentrically connected by a pin 133a to a charging lever arm 136 (FIGS. 5, 6 and 9). In turn, the charging lever 136 is secured to a cam shaft 140 for imparting rotation thereto. The cam shaft 140 is journalled for rotation by the spaced side panels 127 and 128.

Supported by the cam shaft 140 for free rotation is a floating ratchet wheel 145. Fixed to the ratchet wheel 145 in the vicinity of the periphery of the ratchet wheel 145 for rotation therewith is a drive roller or a drive block 146. When the ratchet wheel 145 is rotated clockwise, as viewed in FIGS. 6 and 9, the drive roller 146 engages the charging lever arm 136 for rotating the cam shaft 140 in the clockwise direction as viewed in FIGS. 7 and 9. Rotation of the charging lever arm 136 in the clockwise direction (FIGS. 6 and 9) actuates the closing spring lever 133 through the pin 133a, thereby charging the closing spring 130.

In order to rotate the ratchet wheel 145 in the clockwise direction (FIGS. 6 and 9) to rotate the drive roller 146 for rotating the charging lever 136 in the clockwise direction (FIG. 6), a spring loaded pawl 151 (FIGS. 5, 6 and 9) is mounted on a lever arm 152 through a pin 152a to engage successively the teeth of the ratchet wheel 145. The pawl 151 advances step-by-step the ratchet wheel 145 in the clockwise direction (FIGS. 6 and 9) for the charging of the closing spring 130. The lever arm 152 is supported at one end for pivotal movement by the cam shaft 140. At the other end thereof, the lever arm 152 is formed with an elongated slot 154 (FIGS. 6 and 9). A pin with a roller 155 is eccentrically mounted on a rotatable disc 156. The rotatable disc 156 is driven by a drive shaft 157 of a suitable motor 158, such as Ametek Model E-6680, by a gear arrangement including a drive gear 159, a driven gear 159b and a driven shaft 159c. The rotatable disc 156 is fixed to the driven shaft 159c for rotation therewith.

When the motor 158 is operated, the pin and roller 155 move in a circular motion. The circular motion of the pin and roller 155 is translated into a reciprocating motion at the end of the lever arm 152, thereby causing the pawl 151 to be actuated along a reciprocating path. The pawl 151 is spring loaded and engages the teeth of the ratchet wheel 145 once during each reciprocating cycle. The ratchet wheel 145 is stepped during each revolution of the motor drive shaft 157 and is advanced in the clockwise direction (FIGS. 6 and 9).

The ratchet wheel 145 is held in the advanced position by a spring loaded holding pawl or detent 160 (FIG. 6), which is pivotally mounted at one end of a lever arm 161. The lever arm 161 is spring loaded for holding the detent 160 in the ratchet wheel holding position. There is an elongated slot 161a in a lever arm 161 through which a pin 162 is located. The pin 162 is secured to the mechanism frame and is, therefore, in a fixed position. A tension spring 162' holds the lever arm 161 in an upwards direction with the bottom of the slot 161a resting against the pin 162. When the pawl 151 advances the ratchet wheel one tooth, the holding pawl 160 engages the next successive tooth. As the pawl 151 reciprocates back to engage its next tooth, the ratchet wheel 145 does not rotate, since it is held by the holding pawl 160.

The advancement of the ratchet wheel 145 may also be accomplished manually. In this case, the pawl 151 remains static and acts as a holding pawl. By means of a suitable lever inserted into the lever arm 161, the lever arm 161 can be moved downward against the urgency of spring 162'. This action moves the holding pawl 160 which drives the ratchet wheel 145 in a clockwise direction, advancing it one tooth. The slot 161a limits the travel imparted to the ratchet wheel 145 to one tooth pitch. When the lever arm 161 is reset by the spring 162', the advancement of the ratchet wheel is enabled by the next manual actuation of the lever arm 161.

When the closing spring 130 is fully charged, the closing spring lever 133 actuates a suitable spring loaded limit switch (not shown). The opening of the limit switch interrupts the energizing circuit for operating the motor 158, thereby temporarily deenergizing the motor 158.

Fixed to the cam shaft 140 is a closing stop lever arm 175 (FIGS. 8 and 9). Mounted at one end of the closing stop lever arm 175 is a closing stop roller 176. Projecting outwardly toward the closing stop lever arm 175 in the path of the roller 176, when the closing spring 130 is fully charged, is a spring loaded close latch lever arm 177. When the closing spring 130 is fully charged, the closing stop roller 176 engages the close latch lever arm 177 to stop further rotation of the shaft 140 in the clockwise direction (FIGS. 6-8 and 9).

When it is desired to close the interrupter or circuit breaker contact in the interrupters 30-32, a close solenoid 180 is energized (FIGS. 8 and 9). The plunger of the close solenoid 180 is extended to engage a pivotally mounted lever arm 181. The lever arm 181 pivots in the clockwise direction as shown in FIGS. 8 and 9. Connected to the lever arm 191 at one end thereof is a push rod 182. As the lever arm 181 pivots in the clockwise direction (FIGS. 8 and 9), the push rod 182 is actuated. Fixed to the free end of the push rod 182 is a lever arm 183. Ihe lever arm 183 is pivotally mounted to a support plate 184 (FIG. 8). At one end of the lever arm 183 is a pin 185. When the push rod 182 is moved by the energization of the close solenoid 180, the pin 185 pivots the close latch lever arm 177 out of the path of the stop roller 176.

The removal of the close latch lever arm 177 from the path of the stop roller 176 enables the closing spring 130 to discharge. The discharge of the closing spring 130 actuates the closing spring lever 133. As a consequence thereof, the charging lever arm 136 (FIGS. 5, 6 and 9) pivots in the clockwise direction as viewed in FIGS. 6 and 9. The clockwise rotation of the charging lever arm 136 rotates the cam shaft 140 in the clockwise direction as viewed in FIGS. 7 and 9. The ratchet wheel 145 is freely mounted on the cam shaft 140 and does not absorb the impact resulting from the discharge of the closing spring 130. The clockwise rotation of the cam 150 (FIGS. 7 and 9) causes a roller 189 on a toggle linkage 190 (shown in dotted lines in FIG. 7) to be moved by the lifting action of the cam 150 to a position shown in solid lines in FIGS. 7 and 9. In this position, the cam 150 has rotated approximately 180°.

The toggle linkage 190 comprises a link 190a fixed at one end to a stationary mounting bracket. A link 190a of the toggle linkage 190 is pivotally attached to the link 190b at the other end thereof. At the junction of links 190a and 190b is the roller 189a. A link 190c at one end thereof is pivotally attached to the mechanism yoke 131 and at the other end thereof is pivotally attached to the link 190b. At the junction between the links 190b and 190c is mounted the roller 189.

The yoke 131 includes a hub 131a (FIGS. 5 and 7) that receives a hub guide shaft 195. The hub 131a is supported by the hub guide shaft 195 for axial movement along the hub guide shaft 195. The hub guide shaft 195 is supported by the top panel 56 and a confronting plate 196. The hub 131a of the yoke 131 is secured to the toggle link 190c for movement therewith. When the cam 150 actuates the roller 189 to the position shown in solid lines in FIG. 7, the junction of the links 190b and 190c is lifted by the cam 150. This action moves the hub 131 in the direction shown by the arrow 197 of FIG. 7. The movement of the yoke 131 in the direction of the arrow 197 lifts or raises simultaneously the insulated interrupter actuating rods or lift rods 73 for closing the interrupter or circuit breaker contacts of the interrupters 30–32 simultaneously. Each insulated interrupter actuating rod or lift rod 73 is spring loaded by a spring 198 to apply contact pressure for closing the interrupter or circuit breaker contacts.

The movement of the yoke 131 operates a lever system which, in turn, operates an auxiliary switch in a well-known manner. The operation of the auxiliary switch de-energizes the close solenoid 180 allowing the close solenoid 180 and the lever system to reset and enabling energization of the trip solenoid 205.

For opening the interrupter or circuit breaker contacts for the interrupters 30–32, such as contacts 60 and 70 for the interrupter 30, an opening spring 200 (FIG. 7) encircles the yoke guide shaft 195. When the closing spring 130 was discharged, the yoke 131 moved in the direction of the arrow 197 (FIG. 7). This action charged or compressed the opening spring 200. In moving to the closed position, the links 190b and 190c are over toggled. This causes the force of the trip spring 200 to tend to rotate the link 190a in a counterclockwise direction (FIGS. 7 and 9). This rotation is prevented by the action of trip latch lever 210 engaging the trip latch roller 189a and the pin 209.

Should an overload condition occur in the electrical system after the opening spring 200 is charged, an opening or trip solenoid 205 (FIGS. 7 and 9) is energized in a well-known manner. As a consequence thereof, the plunger of the opening or trip solenoid 205 is actuated to pivot a lever arm 206 clockwise as viewed in FIGS. 7 and 9. Attached to the lever arm 206 is a trip actuating rod 207. The movement of the actuating rod 207 causes the counterclockwise pivoting of a spring loaded trip latch lever arm 210 as shown in FIGS. 7 and 9 through a lever 208 and a pin 209 (FIG. 9).

The counterclockwise pivoting of trip latch lever 210 allows link 190a to pivot counterclockwise with the links 190b and 190c moving downwardly. The yoke 131 is also allowed to move downwardly until stopped by the confronting plate 196 at which time the contacts 60 and 70 are open. The counterclockwise pivoting of link 190a causes the toggeling of links 190b and 190c to be broken. A torsion spring 211 acts to reset a trip latch lever arm 210, which, in turn, acting against trip latch roller 189a causes the links 190b and 190c to reset towards the cam 150 ending in the dotted position of FIG. 7.

The movement of the yoke 131 operates a lever system, which, in turn, operates an auxiliary switch in a well-known manner. The operation of the auxiliary switch de-energizes the trip solenoid 205 allowing the trip solenoid 205 and lever system to reset and enabling energization of the close solenoid 180.

In the event vacuum interrupters are employed for larger circuit breaker ratings, then the vacuum interrupters 30–32 will be commensurately larger in size. Larger vacuum interrupters will require larger ceramic envelopes than is shown for the ceramic envelopes 60a and 70a (FIG. 7). A greater diameter for such larger ceramic envelopes can be accommodated by the insulated housings 55, 101 and 111. However, a greater length for such larger ceramic envelopes requires a commensurate increase in length for the insulated housings 55, 101 and 111. In increasing the length of the insulated housings 55, 101 and 111, the increase in dimension will be effected in the space between the respective vertically aligned links, namely: between links 90 and 95, 100 and 105, and 110 and 115 (FIGS. 7 and 10). Thus, the distance between the links 90 and 95, 100 and 105, and 110 and 115 will be increased. The rotatable adjustment, the vertical alignment, and the horizontal alignment for the links 90 and 95, 100 and 105, and 110 and 115 will remain the same.

I claim:

1. A circuit breaker with a panel for a multiple phase electrical system comprising:
    (a) an interrupter for each phase of the electrical system, each of said interrupters comprising a housing, means for releasably securing at least one of said housings to said panel, a fixed circuit breaker contact disposed in said housing, and a movable circuit breaker contact disposed in said housing, at least one of said housings being adjustably rotatable relative to said panel when released from securement to said panel;
    (b) a rigid fixed connecting link attached to each of said housings for rotation with its associated housing and connected to the fixed contact within its associated housing for establishing an electrical connection therewith, said fixed connecting links being spaced apart; and (c) a rigid movable connecting link attached to each of said housings for rotation with its associated housing and connected to the movable contact within its associated housing for establishing an electrical connection therewith, said movable connecting links being spaced apart, (d) at least one of said rotatable housings, when released from securement to said panel, being adjustably rotatable for selecting the extent of spacing between fixed connecting links and for selecting the extent of spacing between movable connecting links.

2. A circuit breaker as claimed in claim 1 and comprising an operating mechanism connected to said movable contacts for actuating said movable circuit breaker contacts simultaneously.

3. A circuit breaker as claimed in claim 2 wherein said operating mechanism comprises an actuating rod connected to each of said movable circuit breaker contacts for actuating said movable circuit breaker contacts simultaneously.

4. A circuit breaker as claimed in claim 3 wherein said operating mechanism comprises an opening spring and a closing spring, said springs being charged to store energy for actuating said actuating rods.

5. A circuit breaker as claimed in claim 4 wherein said operating mechanism comprises a yoke at times actuated by said closing spring and at other times actuated by said opening spring for actuating said actuating rods simultaneously.

6. A circuit breaker as claimed in claim 5 wherein said yoke is supported by a shaft for rectilinear movement, means responsive to the discharge of said closing spring for moving said yoke in one direction along said shaft for actuating said actuating rods simultaneously for closing said circuit breaker contacts simultaneously, said opening spring being mounted on said shaft in abutment with said yoke for being charged by said yoke moving in said one direction, the discharge of said opening spring moves said yoke in an opposite direction along said shaft for actuating said actuating rods simultaneously for opening said circuit breaker contacts simultaneously.

7. A circuit breaker with a panel for a three phase electrical system comprising:

A. an interrupter for each of the phases of an electrical system, each of said interrupters comprising:
   a. a cylindrical housing having an axis,
   b. a fixed contact disposed in said housing,
   c. a movalbe contact disposed in said housing, said movable contact being aligned with and confronting said fixed contact in the axial direction, and
   d. means for releasably securing a plurality of said housings to said panel;

B. said axes of said housings being disposed in parallel relation, said axes of said housings being triangularly arranged;

C. a rigid fixed connecting link attached at one end thereof to each of said housings for rotation with the associated housing and connected to the fixed contact within its associated housing for establishing an electrical connection therewith, each of said fixed connecting links having a free end at the other end thereof, the free ends of said fixed connecting links being disposed spaced apart in parallel relation in a common plane; and D. a rigid movable connecting link attached at one end thereof to each of said housings for rotation with the associated housing and connected to the movable contact therein for establishing an electrical connection therewith, each of said movable connecting links having a free end at the other end thereof, the free ends of said movable connecting links being disposed spaced apart in parallel relation in a common plane, E. said housings connected to outwardly disposed fixed connecting links of said fixed connecting links and connected to outwardly disposed movable connecting links of said movable connecting links being rotatably adjustable about their respective axes, when released from securement to said panel, for selecting the extent of spacing between parallel ends of successive fixed connecting links and for selecting the extent of spacing between parallel ends of successive movable connecting links.

8. A circuit breaker as claimed in claim 7 wherein said axes of said housings are arranged to define an equilateral triangle.

9. A circuit breaker as claimed in claim 7 wherein each of said fixed connecting links and each of said movable connecting links project radially outward form their associated housings.

10. A circuit breaker as claimed in claim 7 wherein associated fixed contact links and movable contact links are axially aligned.

11. A circuit breaker as claimed in claim 10 wherein said axes of said housings are arranged to define an equilateral triangle.

12. A circuit breaker as claimed in claim 7 and comprising an operating mechanism connected to said movable contacts for actuating said movable circuit breaker contacts simultaneously.

13. A circuit breaker as claimed in claim 12 wherein said operating mechanism comprises an actuating rod connected to each of said movable circuit breaker contacts for actuating said movable circuit breaker contacts simultaneously.

14. A circuit breaker as claimed in claim 13 wherein said operating mechanism comprises an opening spring and a closing spring, said springs being charged to store energy for actuating said actuating rods.

15. A circuit breaker as claimed in claim 14 wherein said operating mechanism comprises a yoke at times actuated by said closing spring and at other times actuated by said opening spring for actuating said actuating rods simultaneously.

16. A circuit breaker as claimed in claim 15 wherein said yoke is supported by a shaft for rectilinear movement, means responsive to the discharge of said closing spring for moving said yoke in one direction along said shaft for actuating said actuating rods simultaneously for closing said circuit breaker contacts simultaneously, said opening spring being mounted on said shaft in abutment with said yoke for being charged by said yoke moving in said one direction, the discharge of said opening spring moves said yoke in an opposite direction along said shaft for actuating said actuating rods simultaneously for opening said circuit breaker contacts simultaneously.

17. An operating mechanism for a circuit breaker comprising:
   (a) a plurality of interrupter actuating rods;
   (b) a yoke engaging said actuating rods for moving said actuating rods simultaneously;

(c) a shaft supporting said yoke for axial movement therealong;
(d) a closing spring arranged to be charged;
(e) means responsive to the discharge of said closing spring for moving said yoke in one direction along said shaft to move said actuating rods simultaneously in one direction; and
(f) an opening spring mounted on said shaft, said opening spring being charged by said yoke moving in said one direction along said shaft, the discharge of said opening spring moves said yoke in an opposite direction along said shaft for moving said actuating rods in an opposite direction.

18. An operating mechanism as claimed in claim 17 wherein said yoke includes a hub with an opening therethrough for receiving said shaft to be supported thereby for axial movement therealong.

* * * * *